(12) United States Patent
Ghosal

(10) Patent No.: US 11,580,042 B2
(45) Date of Patent: Feb. 14, 2023

(54) AUTOMATED AND INTELLIGENT DATA CHANNEL OPTIMIZERS WITH SENSITIVITY ASSESSMENT

(71) Applicant: Seagate Technology LLC, Fremont, CA (US)

(72) Inventor: Sayan Ghosal, Bloomington, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 262 days.

(21) Appl. No.: 17/107,576

(22) Filed: Nov. 30, 2020

(65) Prior Publication Data

US 2022/0171727 A1 Jun. 2, 2022

(51) Int. Cl.
*G06F 13/36* (2006.01)
*G06N 3/08* (2023.01)

(52) U.S. Cl.
CPC ............. *G06F 13/36* (2013.01); *G06N 3/08* (2013.01)

(58) Field of Classification Search
CPC .......... G06F 13/36; G06N 3/08; G06N 3/006; G06N 3/0454; G06N 7/005
See application file for complete search history.

(56) References Cited

U.S. PATENT DOCUMENTS

| | | | |
|---|---|---|---|
| 5,121,260 A | 6/1992 | Asakawa et al. | |
| 5,774,285 A | 6/1998 | Kassab et al. | |
| 6,069,758 A | 5/2000 | Chung | |
| 6,252,731 B1 | 6/2001 | Sloan et al. | |
| 6,275,346 B1 | 8/2001 | Kim et al. | |
| 6,622,221 B1 * | 9/2003 | Zahavi | G06F 3/0601 703/22 |
| 7,872,978 B1 | 1/2011 | Marrow et al. | |
| 8,479,086 B2 | 7/2013 | Xia et al. | |
| 8,797,666 B2 | 8/2014 | Xia et al. | |
| 2005/0264910 A1 | 12/2005 | Lee | |
| 2006/0023583 A1 | 2/2006 | Annampedu | |

(Continued)

FOREIGN PATENT DOCUMENTS

WO WO-2018222204 A1 * 12/2018 ............. G06N 20/00

OTHER PUBLICATIONS

Zhen Cao et al., "Towards Better Understanding of Black-box Auto-Tuning: A Comparative Analysis for Storage Systems", Jul. 2018 (Year: 2018).*

*Primary Examiner* — Farley Abad
(74) *Attorney, Agent, or Firm* — Holzer Patel Drennan

(57) ABSTRACT

Data channel parameter optimization with intelligent selection of initial data channel conditions and optimization algorithm hyperparameters for use of a black box optimizer to optimize one or more data channel parameters. It is currently identified that the initial data channel condition affects the ability of a black box optimizer to optimize data channel parameters. In turn, by use of an intelligent agent (e.g., employing artificial intelligence or machine learning) to iteratively select optimized initial data channel conditions, the optimization of the data channel may be improved. Moreover, the sensitivity of the data channel parameters may be determined, which allows for identification of a subset of data channel parameters that are varied in an optimization approach. This may result in improved performance of the optimization without sacrificing optimized performance of the data channel.

20 Claims, 10 Drawing Sheets

(56) References Cited

U.S. PATENT DOCUMENTS

| | | | |
|---|---|---|---|
| 2013/0178953 A1* | 7/2013 | Wersborg | G06N 7/02 |
| | | | 700/48 |
| 2020/0334604 A1* | 10/2020 | Mitra | G06Q 10/06315 |
| 2021/0103806 A1* | 4/2021 | Blaichman | G11C 16/08 |
| 2021/0319362 A1* | 10/2021 | Mguni | G06N 7/005 |
| 2022/0019951 A1* | 1/2022 | Khajehnejad | G06Q 10/04 |

* cited by examiner

AUTOMATED AND INTELLIGENT DATA CHANNEL OPTIMIZERS WITH SENSITIVITY ASSESSMENT

BACKGROUND

Magnetic recording channels, also known as data channels, are complex integrated circuits that enable efficient write and read operations for digital data on magnetic data storage media. Specifically, the data channel is a complex electronic circuit that houses all the digital and analog signal processing hardware and algorithms to efficiently write digital data to and read digital data from a magnetic data storage device. Components of the data channel include, for example, the write pre-compensation module for nonlinearity mitigation, AC-coupling filters, asymmetry correction module, timing and gain recovery units, finite impulse response (FIR) filters for equalization, Viterbi detectors, and so on.

To achieve performance efficiency, each component and sub-component of the magnetic recording channel circuit requires fine tuning of its associated parameters (e.g., register values). Optimization strategies may involve running individual and decoupled searches over each data channel circuit parameter, often through manual manipulation by a human user conducting the optimization. While local optimums of each parameter may be obtained, results obtained are not the joint optimum of the various parameters in combination. While the performance of individual components within a data channel may be theorized in response to data channel parameters for a given component, because of the complexity and independence of the integrated circuits that comprise the data channel, the performance of the data channel as a whole is difficult to predict theoretically. As such, in spite of in-depth technical expertise on the underlying algorithms and the data channel circuit, the inherent complexity of the channel technology presents a challenging task to optimize the data channel to achieve a desired performance metric. In turn, performance optimization of the magnetic recording channel as a whole becomes a challenge when parameters of each and every component involved are tuned separately.

SUMMARY

In view of the foregoing, the present disclosure relates to automated optimization of data channel parameters. Specifically, it is presently recognized that the initial data channel conditions from which optimization commences effects optimization of the data channel parameter. As such, rather than constant or randomly selected initial data channel conditions, the present disclosure uses an intelligent agent for optimization of the initial data channel conditions in concert with optimization of other parameters of the optimization system.

In this regard, the present disclosure utilizes intelligent agents that employ machine learning or artificial intelligence for optimization of initial data channel conditions and hyperparameters of an optimization algorithm. In turn, a black box optimizer is used to optimize the data channel parameters. The execution of the black box optimizer may be iteratively performed with optimized selection of the initial data channel conditions and hyperparameters.

In addition, the present disclosure facilitates the determination of a sensitivity of a plurality of data channel parameters on the optimization of the data channel. As such, at least some examples of the present disclosure provide determination of a subset of data channel parameters that most affect the optimization. In turn, optimization may proceed only with respect to the subset of the data channel parameters to provide enhanced optimization performance while conserving time and computing resources required to perform the optimization.

The present disclosure includes a method for optimization of a data channel that includes selecting, with a first intelligent agent, an initial data channel condition comprising initial data channel parameters of the data channel. The initial data channel parameters are communicated from the first intelligent agent to a second intelligent agent and a black box optimizer. The second intelligent agent is operative to select hyperparameters for use by the black box optimizer in an optimization algorithm for optimization of one or more data channel parameters. In turn, the method includes performing the optimization algorithm by the black box optimizer to generate reward information regarding optimization of the data channel in view of the initial data channel parameters and communicating the reward information to the first intelligent agent. The first intelligent agent revises the initial data channel condition to a revised initial data channel condition comprising revised initial data channel parameters using the first intelligent agent and communicating the revised initial data channel parameters to the second intelligent agent and the black box optimizer.

The present disclosure also includes a method for optimization of a data channel that includes iteratively selecting initial data channel parameters for the data channel using a first intelligent agent and performing an optimization algorithm using a black box optimizer having hyperparameters regarding the optimization algorithm selected by a second intelligent agent in operative communication with the black box optimizer. The optimization algorithm iteratively modifies data channel parameters from each of the iteratively selected initial data channel parameters received from the first intelligent agent. The method includes generating reward information for each iterative performance of the optimization algorithm and determining a sensitivity of each of the data channel parameters on the reward information. In turn, a subset of the data channel parameters is selected based on the sensitivity of each of the data channel parameters on the reward information such that the optimization algorithm is executed using the black box optimizer in which only the subset of the data channel parameters is iteratively modified in the optimization algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
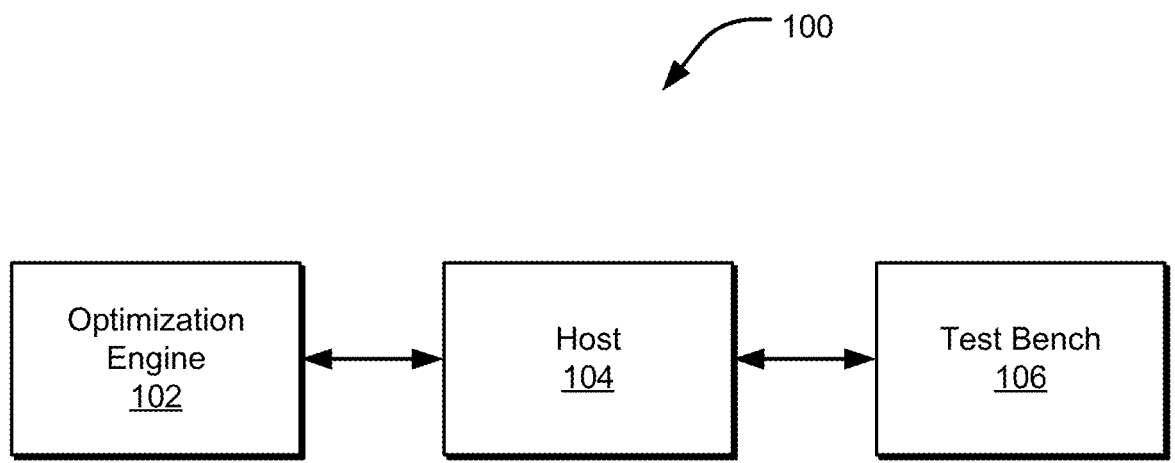
FIG. 1 depicts an example environment in which a data channel may be tested.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Optimization of magnetic recording data channels (also referred to herein simply as data channels) is, as described above, a challenging problem that is important for both laboratory and production applications. In this disclosure, an optimization system (e.g., comprising an optimizer engine that is operative to execute an optimizer algorithm) is described that utilizes intelligent agents in conjunction with a black box optimizer to investigate suitable strategies for fast, effective optimization of data channel parameters of a data channel that is being tested. In particular, respective intelligent agents are provided for optimizing initial data channel conditions (e.g., starting data channel parameter values) and black box optimizer hyperparameters. In turn, a black box optimizer may optimize data channel parameter values from an optimized initial data channel condition using optimized hyperparameter values.

Such an approach is particularly useful for laboratory applications since the intelligent agents help to automate a significant amount of manual investigation. In turn, the optimization of the data channels may be done more efficiently and may achieve improved results as compared to manual investigation alone.

In addition, the relative affect of a candidate data channel parameter on the optimization (also referred to as the sensitivity of a parameters) may be quantitatively assessed to identify a subset of the total candidate data channel parameters that most greatly affect the optimization. That is, the tools presented here provide a scientific way to prioritize important data channel parameters (e.g., a subset) among a data channel parameter set comprising all data channel parameters. For production applications, the proposed method reveals efficient optimization that can reduce optimization time significantly (almost 31% for one example illustrated herein) compared to previously proposed optimization strategies.

At present, a significant amount of manual investigation is required to select the initial data channel parameter conditions, relevant data channel parameter identification, and the optimizer selection. Traditionally, engineers spend a number of months identifying suitable data channel parameters and manually developing optimization routines using the subjective and empirically derived technical knowledge of the data channel. While the technical expertise remains important, due to complexity of channel technology it is difficult to develop intuition on systematic and scientific approaches that provide good optimization results. That is, regardless of the sophistication of the manual optimization, such an approach fails to provide a systematic and scientific approach to the optimization of a data channel.

In contrast, the techniques proposed in the present disclosure utilize agents that employ machine learning or artificial intelligence (e.g., intelligent agents) that can investigate vast numbers of choices in a short time, and by interaction with the experimental setup, identify the favorable optimization strategies. Thus, these algorithms can substantially alleviate the manual effort and time required from the test bench engineer.

Optimization of data channels is important for both laboratory and production applications. Previous approaches use some prevalent numerical optimization algorithms (referred to in the present disclosure as black box optimizers). Such black box optimizers may use, for example, a limited-memory Broyden-Fletcher-Goldfarb-Shanno with bound constraints algorithm (L-BFGS-B) and/or Sequential Quadratic Programming methods toward optimizing data channel parameters that significantly improve the optimization speed and success rates compared to a traditional, manual optimization approach for individual data channel parameters. In contrast to manual, individual optimization where each data channel parameter (stored in a specific register location of channel hardware) is optimized individually while holding the rest of the data channel parameters at constant values, a black box optimizer seeks a joint optimum by varying multiple parameters in each iteration. Input parameters that apply to the optimization algorithm applied to the black box optimizer (referred to herein as hyperparameters) may be tuned as well. An additional layer of optimizer has been proposed that, for example, utilizes Upper Confidence Bound algorithm or Genetic Algorithm to optimize the hyperparameters for use by an optimization algorithm executed by a black box optimizer. Thus, this approach generally utilizes a two-tier approach to optimization in which a black box optimizer selects data channel parameters using an optimization algorithm that is optimized by optimization of the hyperparameters for the optimization algorithm executed by a black box optimizer. In turn, such a two-tier system may be used to converge on an optimized data channel parameter set.

In spite of the relative effectiveness of this earlier two-tier approach, the performance of the black box optimizers have presently been discovered to be heavily dependent on the initial conditions of data channel parameters from which optimization initiates. For example, in laboratory application during integration of new channels, unfavorable channel initial conditions were shown to create optimization failures. That is, for a given optimization approach, different initial data channel conditions may yield different optimization outcomes such that a constant initial channel condition or a randomly selected initial data channel condition may not provide optimized results. In addition, the statistics of the final achievable performance metric and the number of data write/read cycles during optimization run are also dependent on the initial condition of channel parameters. That is, it has presently been identified that the initial data channel condition as represented by the initial values of the data channel parameters has a marked effect on the optimization of the data channel parameters in both overall optimization performance and the optimization efficiency. Therefore, starting from different initial parameters may enhance or detract from the overall optimization. By not accounting for the initial data channel condition (e.g., by randomly selecting initial data channel parameter values), optimization may not be maximized.

Thus, in the present disclosure, the optimization approach is modified to include optimization of the initial data channel conditions (e.g., the initial data channel parameter values from which optimization commences) as well. Here, an optimizing intelligent agent seek joint optimal conditions over the space of initial data channel conditions. In addition, an optimizing intelligent agent may seek joint optimal conditions over the space of hyperparameters specific to the black box optimizer, and ultimately the space of data channel parameters in view of the initial data channel conditions and hyperparameters. In effect, a new dimension to the optimization search space corresponding to the initial data channel condition is provided to further enhance optimization. As such, in addition to optimization of data channel parameters and hyperparameters, the present approach further provides an initial condition optimizer used to optimize the initial conditions of the data channel from which the other optimizations may be performed.

In addition, the approach described herein further allows quantitative assessment of the relevance of each of the candidate data channel parameters based on the sensitivity of the optimization metric (on a normalized scale) with respect to each candidate data channel parameter. The sensitivity of a data channel parameter may be defined as the derivative of the performance metric with respect to each data channel parameter. Based on this definition, the sensitivity, in general, is a function of the values of the candidate data channel parameters. Because the black box optimizers can converge to different local minima starting from different initial data channel conditions, sensitivity depends on the identity of initial data parameter channels as well.

Black box optimizer optimization algorithms that evaluate the gradient of the optimization metric during its iterations (e.g., the Trust Region method) may be preferred because sensitivity can be evaluated as by-product of running these algorithms. Otherwise, custom functions can be developed that utilize the interaction of the black box optimizer with the data channel to numerically determine the sensitivity function for the data channel parameters. Based on the assessed sensitivity of the candidate data channel parameters, the optimizing agent can rank the data channel parameters based on their influence on the optimization metric. It is shown in the examples discussed in greater detail below, that the less influential channel parameters may be removed from the optimization approach during final optimization (with good initial conditions) which saves optimization time. In addition such a tool allows an evaluator to start with a large set of candidate data channel parameters and systematically identify relevant subset of the candidate data channel parameters that have the largest impact on optimization, which may be particularly relevant in laboratory applications.

Referring now to FIG. 1, a data channel optimization system 100 is shown according to one aspect of the present disclosure. The data channel optimization system 100 includes an optimization engine 102, a host 104, and a test bench 106. The optimization engine 102 may comprise one or more intelligent agents and black box optimizers to execute optimization algorithms as described in greater detail below. The optimization engine 120 may utilize optimization approaches to select initial data channel conditions, hyperparameter values, and subsequent data channel parameter values for a magnetic recording channel under test.

The host 104 may be configured to communicate with the optimization engine 102 and the test bench 106. Based on the initial data channel conditions generated by the optimization engine 102, the host 104 reads the performance data from the test bench 106 and determines the data channel parameter performance associated with the initial data channel conditions. The measured performance is then transmitted to the optimization engine 102 and new parameter values are then adjusted accordingly.

The test bench 106 is configured to connect with a device under test, which contains a magnetic recording data channel and various other associated hardware of the tested device. The components and sub-components of the magnetic recording data channel respond to the data channel parameter values generated by the optimization engine 102 and the corresponding performances are tracked by the test bench 106. As will be described in greater detail below an optimization process in which an intelligent agent works to optimize the initial data channel conditions, the data channel parameter values, and hyperparameters for a black box optimizer may be repeated iteratively until a certain condition is met. Conditions include but are not limited to satisfaction of a bit error rate (BER) threshold, pre-determined number of testing iterations, etc.

Figure 2:
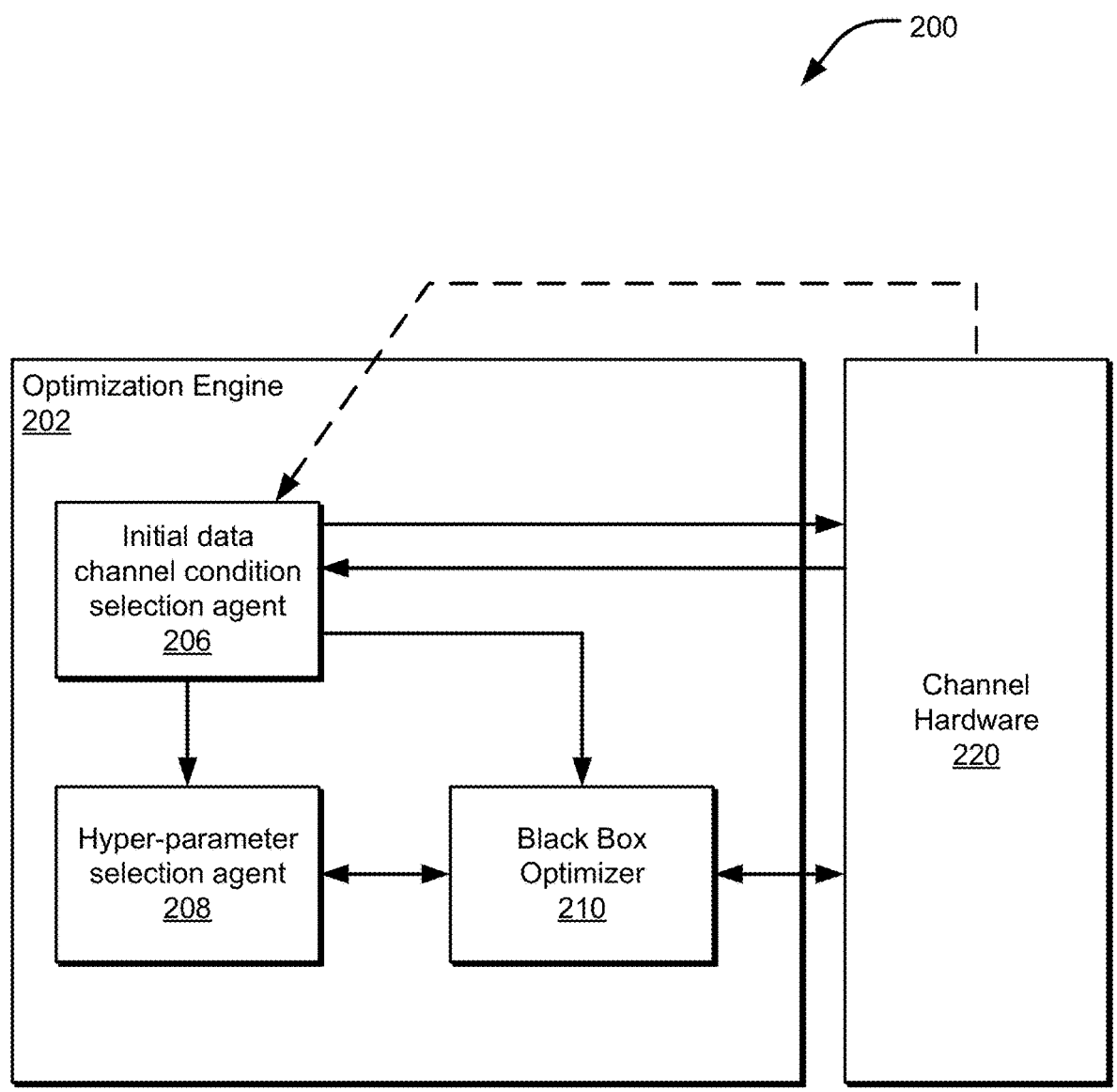
FIG. 2 depicts a simplified block diagram of an example optimization engine in operative communication with data channel hardware for optimization of the channel hardware.

With further reference to FIG. 2, an example optimization system 200 is illustrated in more detail. The optimization system 200 includes an optimization engine 202 that is in operative communication (e.g., by way of a host not shown in FIG. 2) to control the channel hardware 220 of a data channel under test (e.g., operatively connected to the test bench 106). The optimization engine 202 includes an initial data channel condition selection agent 206. The initial data channel condition selection agent 206 may comprise an intelligent agent that may, for example, employ artificial intelligence or machine learning to intelligently select values for the initial data channel condition. In turn, an initial data channel condition (e.g., an initial set of data channel parameter values) may be provided to the channel hardware 220. Also, the initial data channel condition generated by the initial data channel condition selection agent 206 may also be provided to a hyperparameter selection agent 208.

The hyperparameter selection agent 208 may comprise an intelligent agent that may, for example, employ artificial intelligence or machine learning to intelligently select hyperparameter values for an optimization algorithm employed by a black box optimizer 210. The black box optimizer 210 may be operative to iteratively and collectively modify the data channel parameters from the initial data channel conditions provided by the initial data channel condition selection agent 206 to optimize the channel hardware 220 using the hyperparameter values generated by the hyperparameter selection agent 208. Also, as shown in FIG. 1, the channel hardware 220 may provide environmental feedback data to the initial data channel condition selection agent 206 that may be used by the initial data channel condition selection agent 206 in optimizing the initial data channel conditions in subsequent iterations of optimization.

Figure 3:
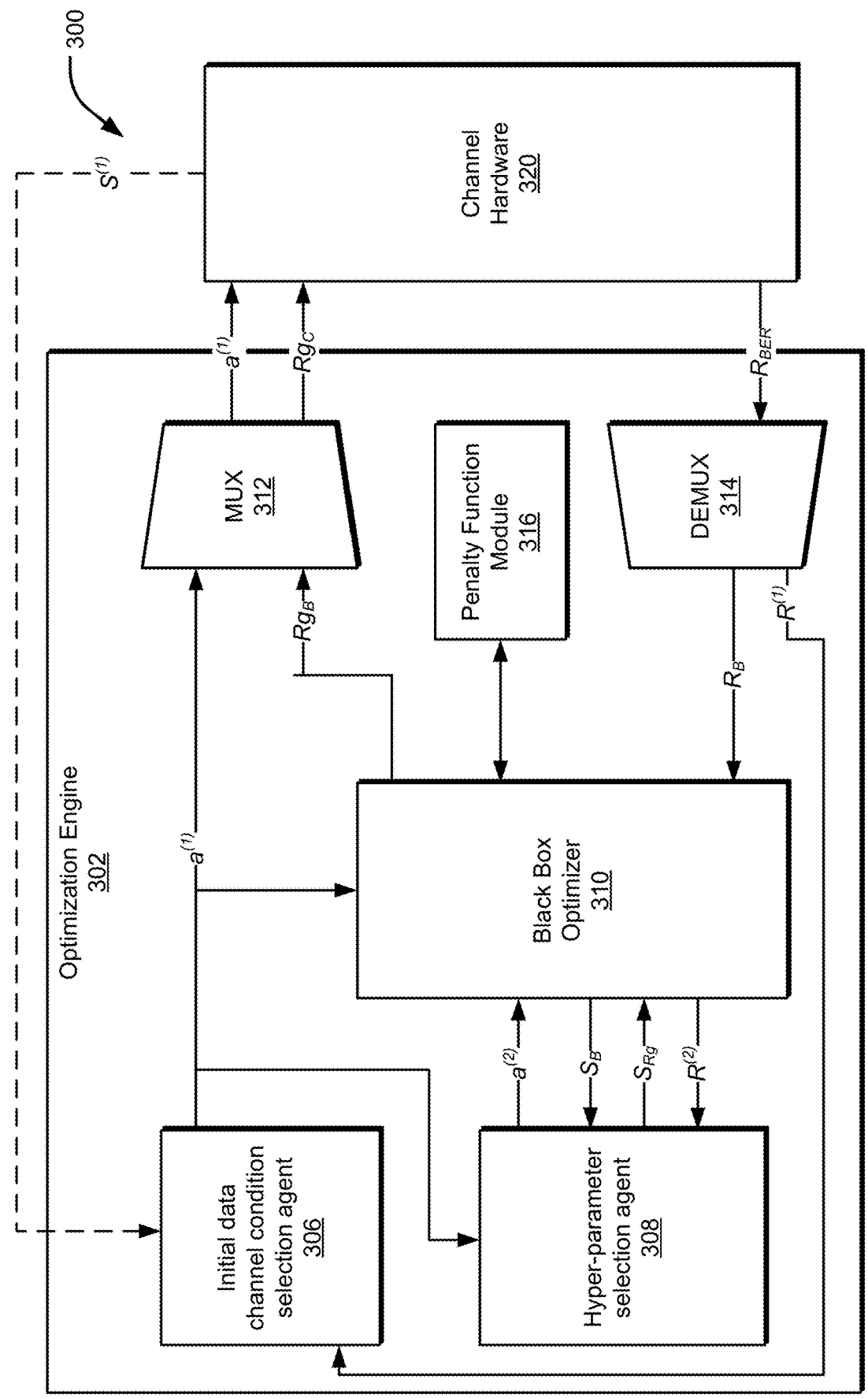
FIG. 3 depicts another example of an optimization engine.

With further reference to FIG. 3, a more detailed illustration of an optimization engine 302 is shown. With respect to an initial data channel condition selection agent 306 and a hyperparameter selection agent 308, as described above, these agents may comprise intelligent optimizing agents that may optimize one or more values in response to an environment that the respective agent is aware. That is, based on environmental feedback, the respective intelligent agent may work to optimize the value or values for which it is tasked. In one example, the intelligent agents may be designed using Reinforcement Learning algorithms.

In general, an agent (e.g., a computer program or algorithm) defined in the framework of Reinforcement Learning, interacts with the environment by taking actions (denoted by a). Information about the environment which is available to the agent is used to define a state of the environment (denoted by S). An action at a particular time ($a_t$) taken by the agent causes the state of the environment prior to the action ($S_t$) to change to a resulting state of the environment ($S_{t+1}$). In addition, the action $a_t$ causes the agent to receive reward information ($R_{t+1}$) from the environment. In episodic tasks, where there is a starting state $S_0$ and a terminal state $S_T$ after a finite number of time steps T, the return $G_t$, at time t, is defined using the relation $G_t := \sum_{k=t+1}^{T} \gamma^{k-(t+1)} R_k$, where the parameter $\gamma$ is referred to as the discount rate such that $\gamma: 0 < \gamma < 1$. The discount rate can be customized to prioritize the immediate reward ($\gamma=0$) or all the consecutive rewards equally ($\gamma=1$).

An objective of the intelligent agent at each time step t, is to observe the state $S_t$ and select the action $a_t$ such that expected value of the return $G_t$ is maximized. In general, the reward $R_{t+1}$ (hence, $G_t$), the state transition $S_t \rightarrow S_{t+1}$, and selection of the action $a_t$, are stochastic processes. The behavior of the agent is governed by a policy, denoted by $\pi$, which is defined by the probability of taking the action $a_t$, given the observation of the state $S_t$. The policy may be further dependent on a vector of tunable parameters $\theta$ for the respective agent. In this regard, the policy may be denoted using $\pi(a|S, \theta)$. Both the initial data channel condition selection agent 306 and the hyperparameter selection agent 308 may follow this general approach to optimizing the respective parameters for the initial data channel condition and the hyperparameters for the black box optimizer, each of which are described below.

The initial data channel condition selection agent 306 may interact with the data channel hardware and find suitable starting values for data channel registers. For the initial data channel condition selection agent 306, the environment ($S^{(1)}$) consists of the data channel as well as other drive metadata comprising disc drive hardware parts from where relevant information is acquired. For example, it may be preferable to run channel optimization for different data rates and zones. Thus for the initial data channel condition selection agent 306, the state $S^{(1)}$, action $a^{(1)}$, reward $R^{(1)}$, and the episodes may be defined as:

State $S^{(1)}$: The data rate or/and zone information from the test bench or production hardware.

Action $a^{(1)}$: The data channel parameter register values selected by the initial data channel condition selection agent 306, which are communicated for use by the channel hardware 320 as shown in FIG. 3. While shown as a single line in FIG. 3, it should be appreciated that the action $a^{(1)}$ may include a plurality of data channel parameter register values for a given action $a^{(1)}$.

Reward $R^{(1)}$: BER value (e.g., expressed as log (BER)) comprising the reward information obtained after writing-reading of the data tracks by the channel hardware 320 using the register values from $a^{(1)}$. $R^{(1)}$ can be customized further using the methods described later including imposing an optimization time penalty and penalty on channel parameter values as discussed in greater detail below.

Episode and return value $G^{(1)}$: The structure of the episode and return value $G^{(1)}$ may be tunable in the optimization system 200 as described above (e.g., using the discount rate). In one example, a single step episode (T=1) with discount parameter value $\gamma=1$. In turn, the equation for $G^{(1)}$ may simplify such that the return equals the reward (e.g., $G^{(1)} = R^{(1)}$). In other examples, additional steps may be provided in the episode and/or a different discount rate may be applied in the discretion of the system designer.

The policy $\pi^{(1)}(a^{(1)}|S^{(1)}, \theta^{(1)})$ followed by the initial data channel condition selection agent 306 may be a function of a parameter vector $\theta^{(1)}$. The parameter vector $\theta^{(1)}$ may consist of weight parameters associated with an artificial neural network. During each step of iteration (also referred to herein as a training epoch) of the initial data channel condition selection agent 306, the parameter vector $\theta^{(1)}$ may be updated so that the policy $\pi^{(1)}(a^{(1)}|S^{(1)}, \theta^{(1)})$ takes a step toward maximizing expected reward information $G^{(1)}$.

In relation to the hyperparameter selection agent 308, the hyperparameter selection agent 308 functions to optimize hyperparameters for use in one or more optimization algorithms implemented by the black box optimizer 310 in performing a search over the search space of data channel parameters modified from an initial data channel condition (e.g., $a^{(1)}$) provided by the initial data channel condition selection agent 306. Thus, the black box optimizer 310 may utilize the hyperparameters optimized by the hyperparameter selection agent 308 in optimizing the data channel parameters from the initial data channel conditions.

In an example, the Trust Region algorithm may be utilized as the optimization algorithm executed by the black box optimizer 310. The following set of hyper-parameters (denoted by $\pi^{(2)}$ as shown in FIG. 3) may be tuned by the hyperparameter selection agent 308:

$T_R$: Initial value for trust radius where the trust radius specifies the maximum Euclidean distance between selected parameters in consecutive iterations. Usually $T_R \in [0.1, 1]$.

$\varepsilon$: Step size used for determining finite difference approximations and for gradient calculations. Typically $\varepsilon \in [0.1, 1]$.

M: The number of iterations. $M \in \{1, 2, 3, \ldots, N_M\}$, where the user can specify the maximum $N_M$.

$T_x$: Tolerance of the trust radius attaining which the Trust Region optimizer stops further iteration.

$T_g$: Tolerance on the norm of calculated gradient after which Trust Region method stops iterating.

Optimization of the hyperparameters may be provided in view of inherent variations in hardware parts during the manufacturing process that create different optimal values for data channel registers for every combination of disc drive head, media, zone and data rate. The initial data channel condition selection agent 306 determines suitable generic data channel parameter values (e.g., data channel register values), however, it is not possible to anticipate the environment variations from one combination of parts comprising the data channel to another. Suitable black box optimization algorithms are applicable toward finding new optimal register values quickly in the presence of part and other variations, by starting from a good initial value predicted by the initial data channel condition selection agent 306. Further, optimization performance is highly dependent on the values of the tunable input-parameters of the black box optimizer 310 (referred to herein as the "hyperparameters").

Thus, in the present disclosure, the hyperparameter selection agent 308 is operative to tune hyperparameters for the black box optimizer 310. The environment for the hyperparameter selection agent 308 includes the initial data channel condition provided by the initial data channel condition selection agent 306 and the black box optimizer 310. The state $S^{(2)}$, action $a^{(2)}$, reward $R^{(2)}$, and the episode for the hyperparameter selection agent 208 may be defined as:

State $S^{(2)}$: Defined to include the initial data channel condition register values predicted by the initial data channel condition selection agent 306 ($a^{(1)}$). In addition, $S^{(2)}$ may contain a vector of sensitivity values ($S_B$) for the channel registers which may be determined at the black box optimizer 310 and communicated to the hyperparameter selection agent 308 as explained in greater detail below.

Action $a^{(2)}$: The hyperparameter values predicted by the hyperparameter selection agent 308 that are input to the black box optimizer 310.

Reward $R^{(2)}$: The final log(BER) reward obtained after running the black box optimizer 310. As with the reward values ($R^{(1)}$) for the initial data channel condition selection agent 306, $R^{(2)}$ can be customized using penalty functions which are described in greater detail below.

Episode and return value $G^{(2)}$: In an embodiment, the hyperparameter selection agent 208 utilizes one step episodes (T=1) with discount rate $\gamma=1$. As such, the return may equal the reward (e.g., $G^{(2)}=R^{(2)}$).

The hyperparameter selection agent 308 follows the policy $\pi^{(2)}(a^{(2)}|S^{(2)}, \theta^{(2)})$ which is governed by the parameter vector $\theta^{(2)}$, where $\theta^{(2)}$ includes the weights of an artificial neural network associated with the hyperparameter selection agent 308. During the training phase, $\theta^{(2)}$ is updated iteratively so that the policy $\pi^{(2)}(a^{(2)}|S^{(2)}, \theta^{(2)})$ becomes better at maximizing the expected return $G^{(2)}$.

In relation to either and/or both of the initial data channel condition selection agent 206 and the hyperparameter selection agent 308, the respective policies $\pi^{(1)}$ and $\pi^{(2)}$ may be provided according to any appropriate approach to machine learning or artificial intelligence. For instance, the policies may be updated using a Reinforcement Learning algorithm. One such example includes an Actor-Critic method.

In the Actor-Critic method, a learning agent (e.g., the initial data channel condition selection agent 306 and/or the hyperparameter selection agent 308) abides by a policy, $\pi(a|\theta)$. The algorithm may include two learning parts, a first is the actor (a) and the second is the critic ($\theta$). The algorithm also includes a state value, $\hat{v}(s, w)$. $\theta$ and w are parameters associated with the actor and the critic, respectively. In the agents described herein, the actor and the critic may be components of an artificial neural network that is trained iteratively. The neural network may be initialized using a uniform distribution method. During each step of iteration, it may be shown that the neural network can be updated using the following update procedure:

1. Observe the state S.
2. Take action A according to the policy $A \sim \pi(a|S, \theta)$ and observe reward R.
3. $\delta \leftarrow R - \hat{v}(S, w)$.
4. Update critic: $w \leftarrow w + a^w \delta \nabla_s \hat{v}(S, w)$.
5. Update actor: $\theta \leftarrow \theta + a^\theta \delta \nabla_\theta \ln(\pi(A|S, \theta))$.

Here, $a^\theta > 0$ and $a^w > 0$ are the step sizes utilized in training the actor and the critic respectively. $\delta$ is an error term which defines the gap between the present estimate of the state value $\hat{v}(S, w)$ and the observed reward R. Also, $\nabla(.)$ denotes the gradient operation.

In this regard, the initial data channel condition selection agent 306 determines suitable initial data channel parameter register values whereas the hyperparameter selection agent 308 investigates the hyperparameter values for the black box optimizer 310. The initial values for channel registers, denoted by $a^{(1)}$, predicted by the initial data channel condition selection agent 306 are provided to the hyperparameter selection agent 308, the black box optimizer 310, and to the channel hardware 320. This may be provided via a multiplexer 312 as shown in FIG. 2. The corresponding log(BER) reward (denoted by $R^{(1)}$) is received back to the initial data channel condition selection agent 306 from channel hardware 320 through a de-multiplexer 314 as shown in FIG. 3. Following the observation, the initial data channel condition selection agent 306 iteratively makes better choice for $a^{(1)}$ that optimizes expected $R^{(1)}$. The hyperparameter selection agent 308 observes the initial register values $a^{(1)}$ from the initial data channel condition selection agent 306 and predicts the hyperparameter values $a^{(2)}$ for the black box optimizer 310.

The initial data channel condition selection agent 306 and hyperparameter selection agent 308 can explore vast number of options and converge to suitable strategies much faster than human users since manual interaction with the experimental setup is inherently a slow process.

In relation to the black box optimizer 310, the black box optimizer 310 may run a numerical optimization algorithm. The black box optimizer 310 starts iteration with the initial channel register value $a^{(1)}$, selected by the initial data channel condition selection agent 306 and hyperparameter values $a^{(2)}$, selected by the hyperparameter selection agent 308. During each step of its iteration, the black box optimizer 310 predicts channel register values (denoted as $Rg_B$) that are input to the channel hardware through the multiplexer 312 in FIG. 3. The black box optimizer 310 also receives corresponding log(BER) reward $R_B$, via the de-multiplexer 314 from the channel hardware 320. When the black box optimizer 310 finishes iteration and converges to a local minimum of the channel register values, the reward at the end of optimization run, denoted by $R^{(2)}$, is fed back to the hyperparameter selection agent 308. The reward $R^{(2)}$ may include the log(BER) reward, a penalty for excessive number of data write-reads, and a penalty for convergence to unwanted register values, which may be evaluated at the penalty function module 316, whose operation is described in greater detail below. That is: $R^{(2)}:=R_B+P_N(N)+P_x(x_F)$, where $R_B$ denotes the log(BER) reward, $P_N(.)$ denotes a penalty on N which is the number of write-read cycles, and $P_x(.)$ denotes a penalty on $x_F$ which is the channel parameter values where the black box optimizer 310 converges. Both $P_N(.)$ and $P_x(.)$ may be provided by the penalty function module 316. The penalties used by a given optimization engine 302 may be selectable by a system designer.

Specifically, in relation to penalties imposed on the reward information, one penalty imposed on the reward may relate to the time it takes to optimize a value as measured by the number of read/writes required. One choice for the penalty function may be a linear function. For example, P(N)=cN, where c is a constant. However it is experimentally observed that a more effective approach is to use penalties of the form:

$$P_N(N) = \frac{M_N}{1 + \exp\left(-\frac{N - N_T}{W_N}\right)}$$

where $|M_N|$ denotes the maximum magnitude of penalty, $N_T$ denotes a threshold beyond which penalty goes high and $W_N$ controls the width of the transition around $N_T$ (where $P_N(N)$ goes from low values to high values). It can be easily observed that for sufficiently negative values of $(N-N_T)$, $P_N(.) \approx 0$ whereas for sufficiently positive values of $(N-N_T)$, $P_N(.) \approx M_N$. Such a penalty discourages the optimizer to find local minima with number of write-reads $N > N_T$. The parameters $M_N$, $N_T$, and $W_N$ may be configurable within the system.

There may also be a penalty on certain unfavorable data channel parameter values. The penalty $P_x(.)$ may be configurable to avoid certain parameters of the data channel or its associated hardware (e.g., the pre-amplifier) which may be empirically or experimentally known to be unfavorable. For example, if good BER is achieved at the expense of high write current then $P_x(.)$ can penalize such high write current which reduces device lifetime. In this disclosure, the black box optimizer 210 may search for data channel parameters constrained by [min, max] limits.

In addition to the [min, max] constraints imposed on data channel parameters, some specific channel register configurations may yield good BER but may be unstable. Such known unstable parameter configurations can be penalized using $P_x(x_F)$ so that the black box optimizer 210 learns to achieve optimized BER while avoiding such parameter settings. For m number of distinct unfavorable parameter settings $\{x_U^{(1)}, x_U^{(2)}, \ldots, x_U^{(m)}\}$, which may also be referred to as penalty points, $P_x(.)$ can be defined using Gaussian Kernel as below:

$$P_x(x_F) = \sum_{i=1}^{m} P_i \exp\left(-\frac{\|x_F - x_U^{(i)}\|^2}{2\sigma_{x,i}^2}\right)$$

where, with sufficiently small $\sigma_{x,i}$, $P_x(x_F) \approx P_i$ for $x_F = x_U^{(i)}$. Further, when $x_F \neq x_U^{(i)}$ ($i \in \{1, 2, \ldots, m\}$) with proper selection of $P_i$ and $\sigma_{x,i}$, $P_x(x_F) \approx 0$. The values for $P_i$ and $\sigma_{x,i}$ may be configurable by a system designer. Design of such rewards helps the intelligent agents to converge to optimization strategies that take less time while avoiding convergence to unwanted register values. Similar strategies can be adopted for defining $R^{(1)}$ as well.

The system 300 may also evaluate the sensitivity of data channel parameters on the reward. By determining the sensitivity of the data channel parameters on the reward, optimization may be focused or in some instances, limited, to data channel parameters that most highly affect the reward to improve the performance of the optimization. In the present disclosure, the sensitivity of the data channel parameters may be defined as a vector containing the derivative of the reward with respect to each channel parameter. That is, for a given set of channel parameters representative of a state $S_B$, a vector containing the derivative of the reward $R^{(2)}$ or $S_B := \nabla R^{(2)}$. Each parameter value may be scaled within a uniform range such as, for example, the channel parameters may be scaled within [−1,+1].

Many black box optimization algorithms numerically evaluate the gradient of the reward $R^{(2)}$ with respect to the candidate parameters in order to iteratively search for the local minima. For example, a Steepest Descent method, Quasi-Newton methods, sequential quadratic programming, and Trust Region methods may evaluate the gradient of the reward. In one example case, at a local minimum of $R^{(2)}$ which is interior to the feasible region of parameters, $S_B = \nabla R^{(2)} = 0$. However, due to non-smooth nature of practical reward functions, discontinuities of the channel parameters and due to finite precision of numerical evaluations, iteration stops at non-zero values of $S_B$. Since the local landscape of $R^{(2)}$ with respect to the channel parameters influences values of $S_B$, the average value of the components of $S_B$, at the end of iterations of the black box optimizer 310, further depend on the starting point: $a^{(1)}$. Based on the order of the highest to lowest magnitudes of the (numerically determined) components of $S_B$, the candidate parameters may be prioritized, and a subset of high-priority parameters is revealed.

The hyperparameter selection agent 308 can select the subset of high-priority registers (shown as $S_{Rg}$) which is input to the black box optimizer 210. The black box optimizer 210 can improve efficiency by emphasizing optimization efforts on the identified relevant subset $S_{Rg}$, while the rest of the registers are held at fixed values.

Figure 4:
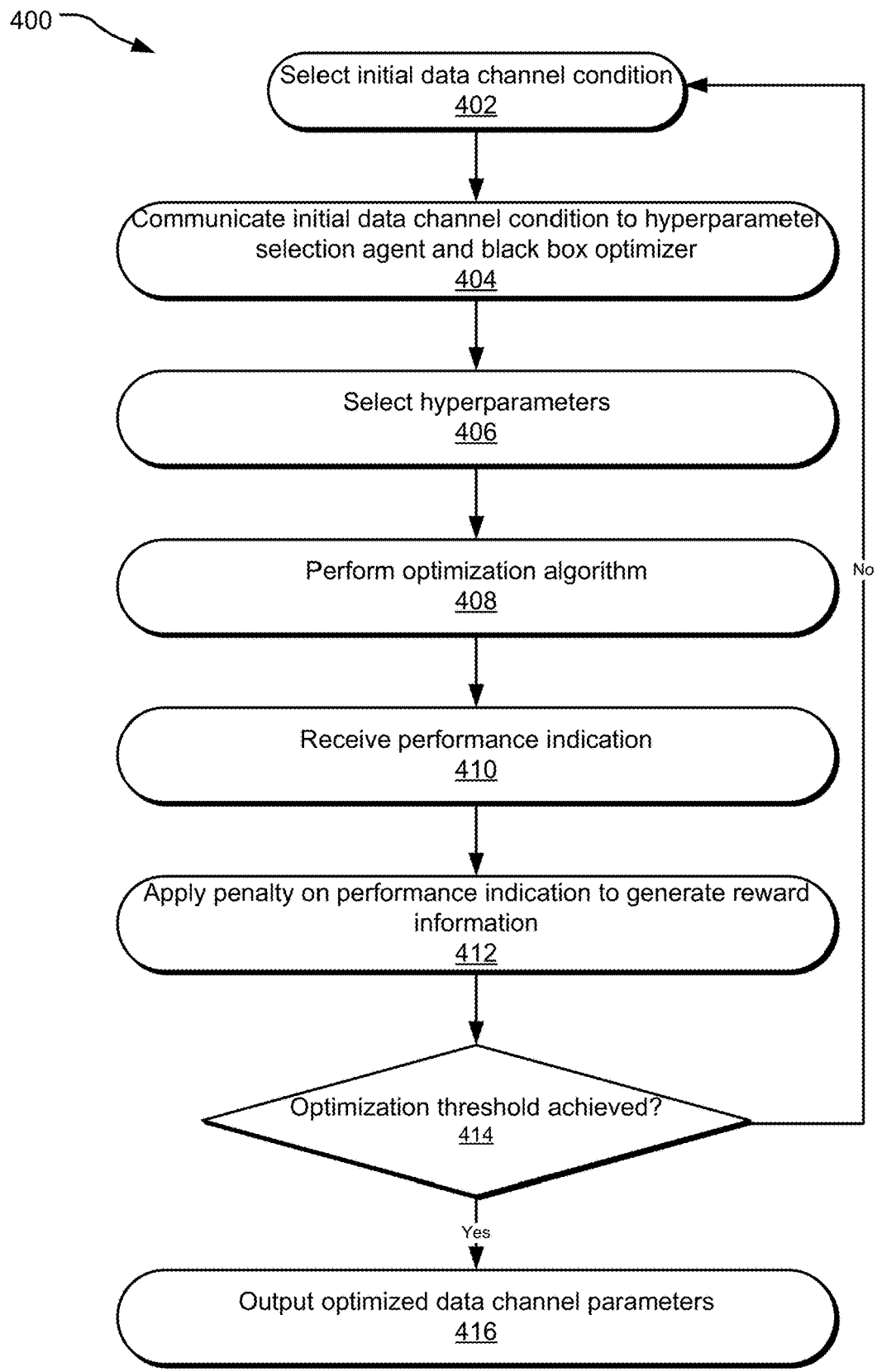
FIG. 4 depicts example operations for optimization of a data channel according to the present disclosure.

With further reference to FIG. 4, example operations 400 are depicted as a flow chart related to a method of optimization of data channel parameters according to the present disclosure. The operations 400 include a selecting operation 402 in which a first intelligent agent (e.g., the initial data channel condition selection agent as described above) selects an initial channel conditions for a data channel to be optimized. The selection operation 402 may include selection of initial data channel parameters including register values for a plurality of data channel parameters. The operations 400 also include a communicating operation 404 in which the initial data channel condition selected at the selecting operation 402 is provided to a black box optimizer and a second intelligent agent such as a hyperparameter selection agent as described above. Once the initial data channel condition is received at the second intelligent agent, a selecting operation 406 is performed that includes selection of hyperparameters for an optimization algorithm to be executed by a black box optimizer.

In turn, the operations 400 include a performing operation 408 in which the black box optimizer performs or executes an optimization algorithm. The performing operation 408 may include varying the plurality of data channel parameters from the initial data channel condition selected by the first intelligent agent at the selecting operation 402. Specifically, the performing 408 may include execution of the optimization algorithm using the hyperparameters for the optimization algorithm selected by the second intelligent agent. The performing 408 may include establishing the register values for the data channel parameters, performing a number of read/write cycles, and receiving a bit error rate calculation regarding the read/write cycles. Such information may comprise performance information that is received at an optimization engine at a receiving operation 410.

As discussed above, a return may comprise reward information, or reward information may be adjusted by various parameters such as a discount rate, number of training steps, or the like. Furthermore, one or more penalties may be imposed on specific data channel parameters, a time to complete optimization, or a number of read/write cycles that occurred in the optimization. In this regard, the operations 400 may include an applying operation 412 in which a penalty and/or discount rate may be applied to the performance information to generate reward information regarding the optimization.

A determining operation 414 determines whether an optimization threshold has been achieved. The optimization threshold may include a given target reward information value such as a given bit error rate that the data channel should perform below, a number of iterations, an elapsed time, or some other metric. If the optimization threshold is not achieved, the operations 400 may iterate back to the selection operation 402. In a subsequent iteration, the first intelligent agent may receive state information (e.g., the performance indicator or reward information) to select a revised initial data condition with revised initial data channel parameter values. In subsequent iterations, the selecting operation 402 may also include receiving the reward information from the previous iteration to allow for selection of the revised initial data channel condition in view of a policy of the first intelligent agent for optimization of the initial data channel condition.

At the determining operation 414, if the optimization threshold has been achieved, the operations 400 may include outputting optimized data channel parameters for the data channel. Moreover, as described above, environmental information such as a data rate and/or zone of the data channel may be provided such that the operations 400 may be repeated with respect to different data rates and/or zones of the data channel.

Figure 5:
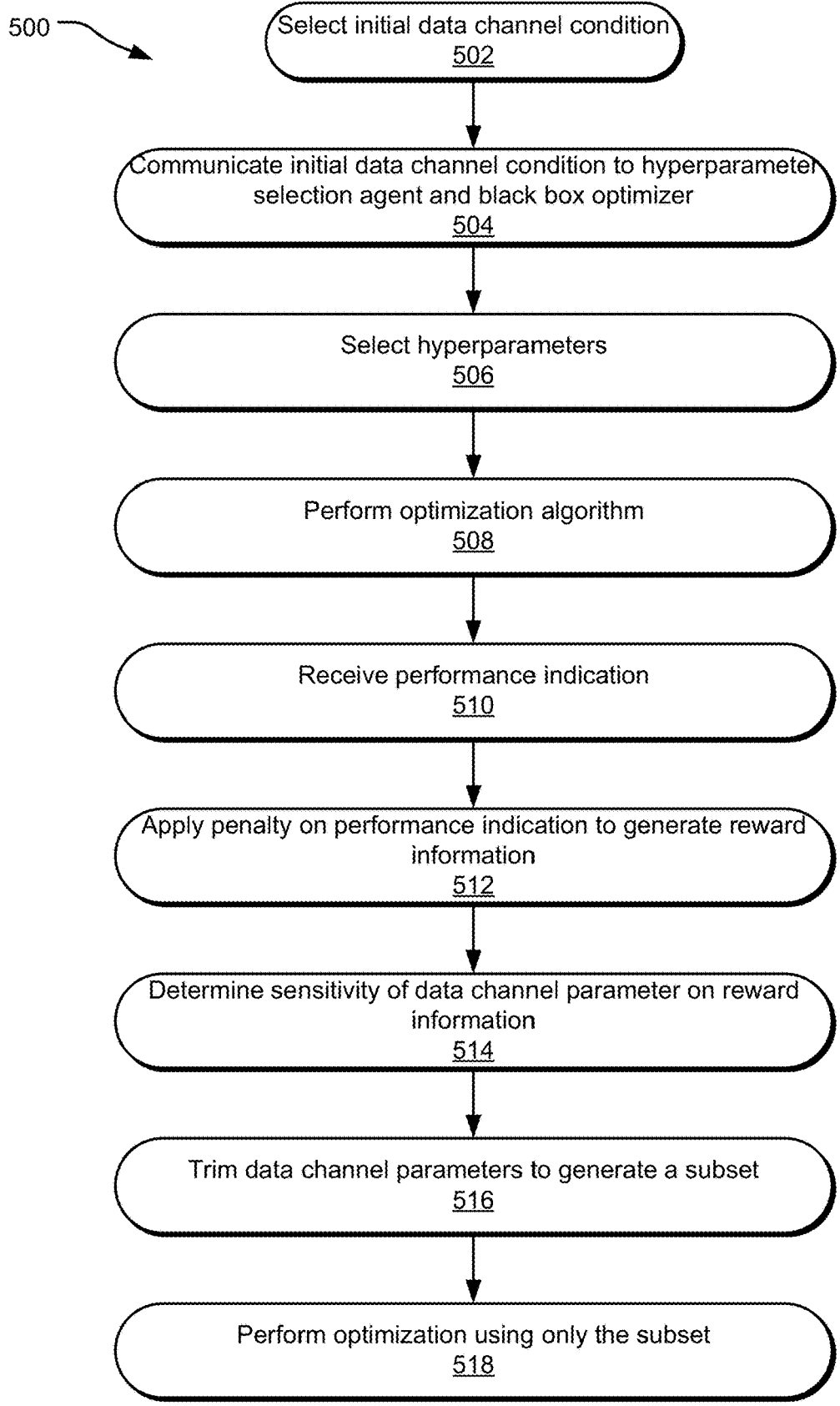
FIG. 5 depicts example operations for determining sensitivity of data channel parameters on optimization reward information to determine a subset of data channel parameters for optimization.

FIG. 5 illustrates operations 500 related to selective use of a subset of data channel parameters based on the sensitivity of the data channel parameters on reward information. While FIG. 5 is shown separately from FIG. 4, it may be appreciated that the selective use of a subset of data channel parameters may be used for one or more iterations of the operations 400 shown in FIG. 4 without limitation.

In FIG. 5, the operations 500 include a selection operation 502 in which an initial data channel condition comprising initial data channel parameters is selected. A communicating operation 504 communicates the initial data channel condition to a second intelligent agent (i.e., a hyperparameter selection agent) and a black box optimizer. A selection operation 506 includes selection of hyperparameters for an optimization algorithm to be executed by the black box optimizer. The selection operation 506 may be executed by the second intelligent agent in view of the initial data channel condition received from the first intelligent agent. The operations 500 include performing the optimization algorithm in a performing operation 508.

In turn, a receiving operation 510 includes receiving a performance indication of the optimization from the data channel under test. The operations 500 may include applying one or more penalties in an applying operation 512 as described above.

The operations 500 also include a determining operation 514 in which the sensitivity of the data channel parameters on the reward information is determined. As described above, this may include a gradient function that may calculate a derivative of the data channel parameters relative to the reward information. In any regard, based on the determined sensitivity, a trimming operation 516 may be conducted to identify a subset of the data channel parameters having the greatest effect on the reward information. For example, the data channel parameters may be ranked according to sensitivity and a trim value applied to the ranked data channel parameters.

In any regard, once the subset of the data channel parameters has been identified, the operations 500 may include a performing operation 518 that includes performing an optimization (e.g., at least on iteration of the operations in FIG. 4) using only the subset of the data channel parameters. In some examples, a number (e.g., including potentially all) iterations of the operations in FIG. 4 may be conducted using only the subset of the data channel parameters. In this regard, data channel parameters outside of the subset of the data channel parameters may be held constant during optimization that occur only with respect to the subset of data channel parameters.

Example

Example results are presented below in relation to FIGS. 6-9. The example illustrated utilized a data channel in which the proposed algorithm is verified, at the data rate of 2100 Mbps, over 13 registers that include data channel parameters comprising:
 4 write pre-compensation registers
 5 registers from the analog front end
 2 registers from digital back end
 2 registers from the Soft Output Viterbi Algorithm (SOVA)

Figure 6:
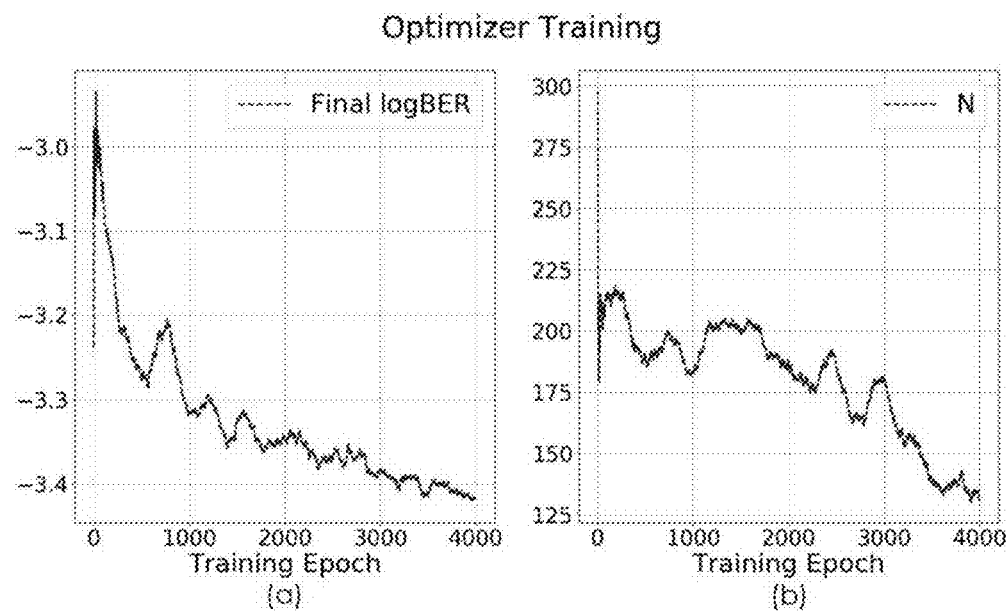
FIG. 6 depicts example results for both a bit error rate and a number of read/write events over a training epoch using an optimization approach according to the present disclosure.

FIG. 6 illustrates the training phase of the optimizer algorithm, that is, when an initial data channel condition selection agent and hyperparameter selection agent are learning the suitable initial condition and hyper-parameters of a black box optimizer, respectively. In FIG. 6, for graph (a) and graph (b), the x-axes represent the epoch number (iteration of the learning agents). The y-axis in FIG. 6 graph (a) denotes the mean log(BER) achieved at the end of black box optimizer runs and the y-axis in FIG. 6 graph (b) shows the average number of write/read cycles (denoted by N) that were conducted to finish the optimization runs by the black box optimizer. It is evident that with progressing epochs, the final achievable BER improves whereas N is reduced as the number of training epochs elapse. That is, with better initial conditions that are revealed by the initial data channel condition selection agent and optimized hyperparameters from the hyperparameter selection agent, the black box optimizer finds the local minima more effectively and more quickly. It should be noted that in absence of environmental variations, the black box optimizer may not be necessary and good initial guess for channel register values by an initial data channel condition selection agent may be sufficient to provide optimization of the data channel. However, in practical applications, unforeseen environment changes may be accommodated for by utilization of the hyperparameter selection agent and black box optimizer in conjunction with the initial data channel condition selection agent.

Figure 7:
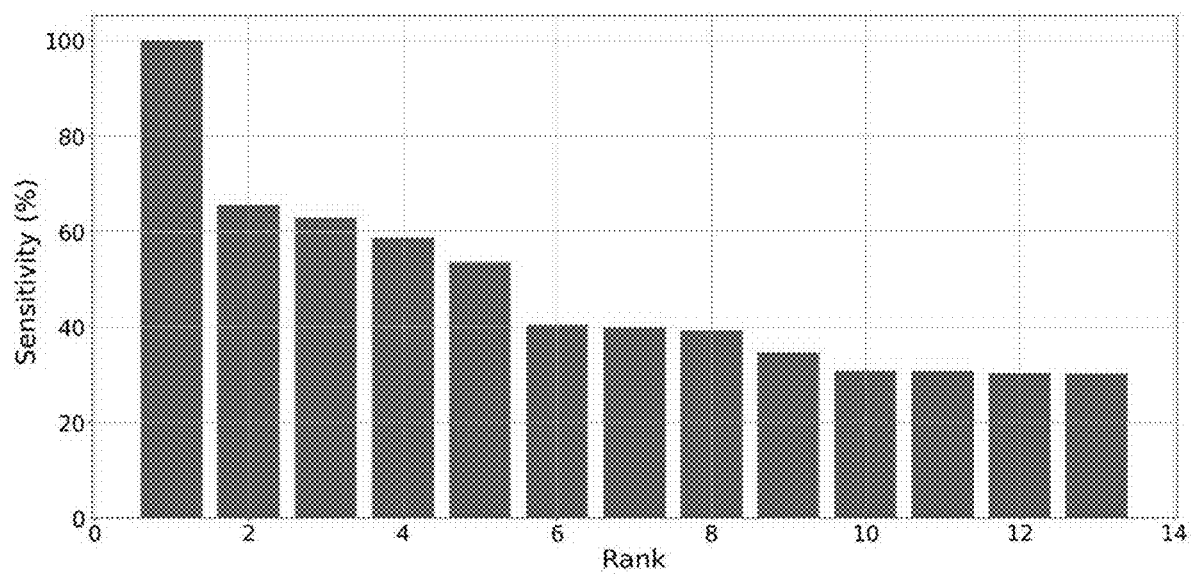
FIG. 7 depicts an example ranking of data channel parameters according to the sensitivity of the respective data channel parameters to optimization.
Figure 8:
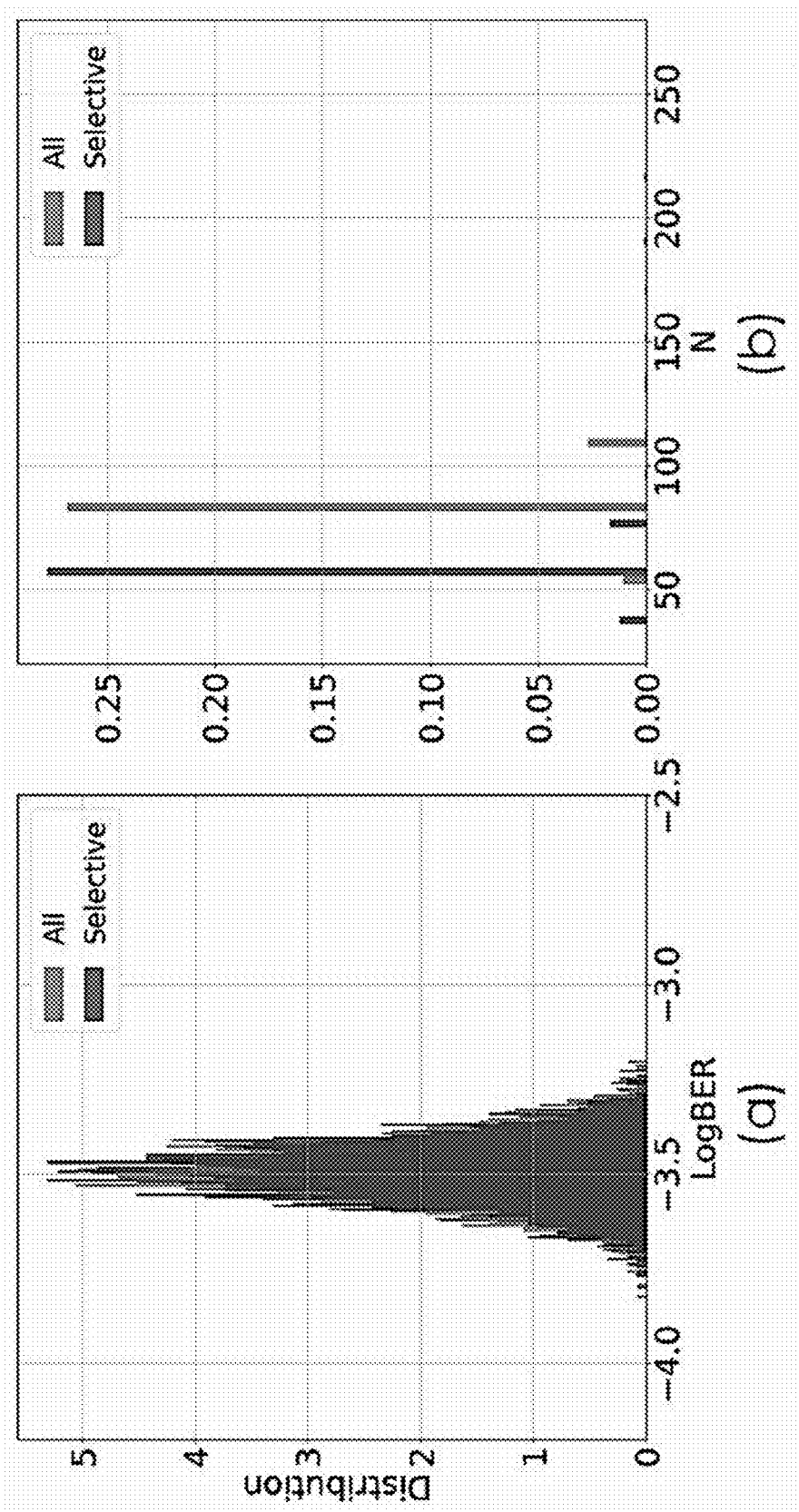
FIG. 8 depicts results of a comparison of an optimization approach in which either all channel parameters or a selected subset of the data channel parameters are optimize based on the sensitivity of the selected subset of data channel parameters.

The effectiveness of prioritizing the data channel parameter values (e.g., register values) based on their sensitivity is also demonstrated in this example. In FIG. 7, the 13 candidate registers described above have had the relative sensitivity for each data channel parameter determined. In turn, the data channel parameters are ranked from the highest to the lowest sensitivities as shown in FIG. 7. The highest sensitivity is assumed to be 100 percent. For demonstration, the registers with sensitivity values less than 34.3 percent (denoted here as trim value or trim percentage, which is selectable by a system administrator) may be discarded during optimization. FIG. 8 graph (a) demonstrates that when all the candidates are chosen for black box optimization, the resulting log(BER) distribution has a mean of −3.493 with a standard deviation of 0.088. The performance of the optimization using all candidates remains similar to that of discarding the registers below the trim percentage that has a log(BER) distribution with a mean or −3.49 with a standard deviation of 0.086.

However, the number of write/reads denoted by the value N, required by the black box optimizer reduces as demonstrated in FIG. 8 graph (b). Here, the mean value of N reduces from 84.45 to 57.58 which is an improvement by 31.8%.

Figure 9:
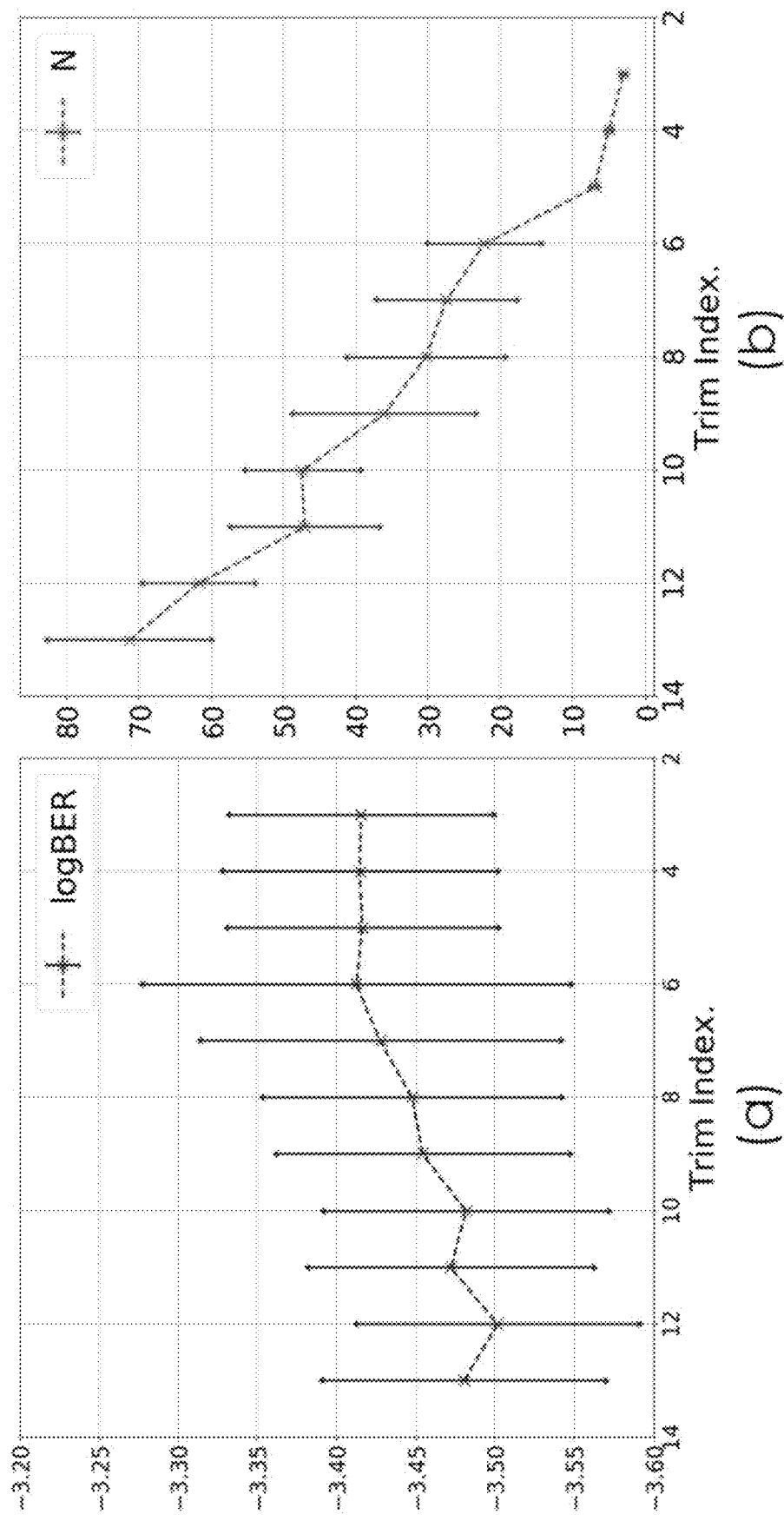
FIG. 9 depicts the effect on a bit error rate and a number of read/write events based on changing a trim index relative to the sensitivity of the data channel parameters.

Further evidence is shown in FIG. 9. Here, the candidate registers are trimmed one after another starting from the lowest sensitivity (rank 13) and only the registers with higher sensitivity are kept during optimization. The statistics of final log(BER) and N are shown in FIG. 9 graph (a) and FIG. 9 graph (b) respectively. From FIG. 9 graph (a), it is observed that log(BER) performance can be maintained by trimming till the register ranked 10, where mean of N is reduced from 71.3 to 47.3 (reduction of write/read cycles N by 33.7%). However, further trimming of registers comes at a cost of sacrificing the final log(BER) values, in which case, some of the important registers are left without optimization. Thus, it is evident that judicious trimming technique substantially expedites the optimization effort. The hyperparameter selection agent may utilize this phenomenon to ignore less important registers (i.e., those below the trim value) that improves black box optimization time without losing BER.

It has been found that the use of the initial data channel condition selection agent in combination with the hyperparameter selection agent and black box optimizer allows the sensitivity of the data channel parameters to be determined. For instance, when initial data channel conditions were selected randomly or often manually, the sensitivity of the data channel parameters is not detectable as the initial condition is random and does not provide sufficient gradient data. Without optimization of the initial condition in addition to the hyper-parameters, the fine balance between final log(BER) with N as shown in FIGS. 5 and 7 is not possible. Specifically, the additional 31.8% reduction in write-read cycles as demonstrated in FIG. 7(b) is not possible without the sensitivity assessment techniques proposed here.

Figure 10:
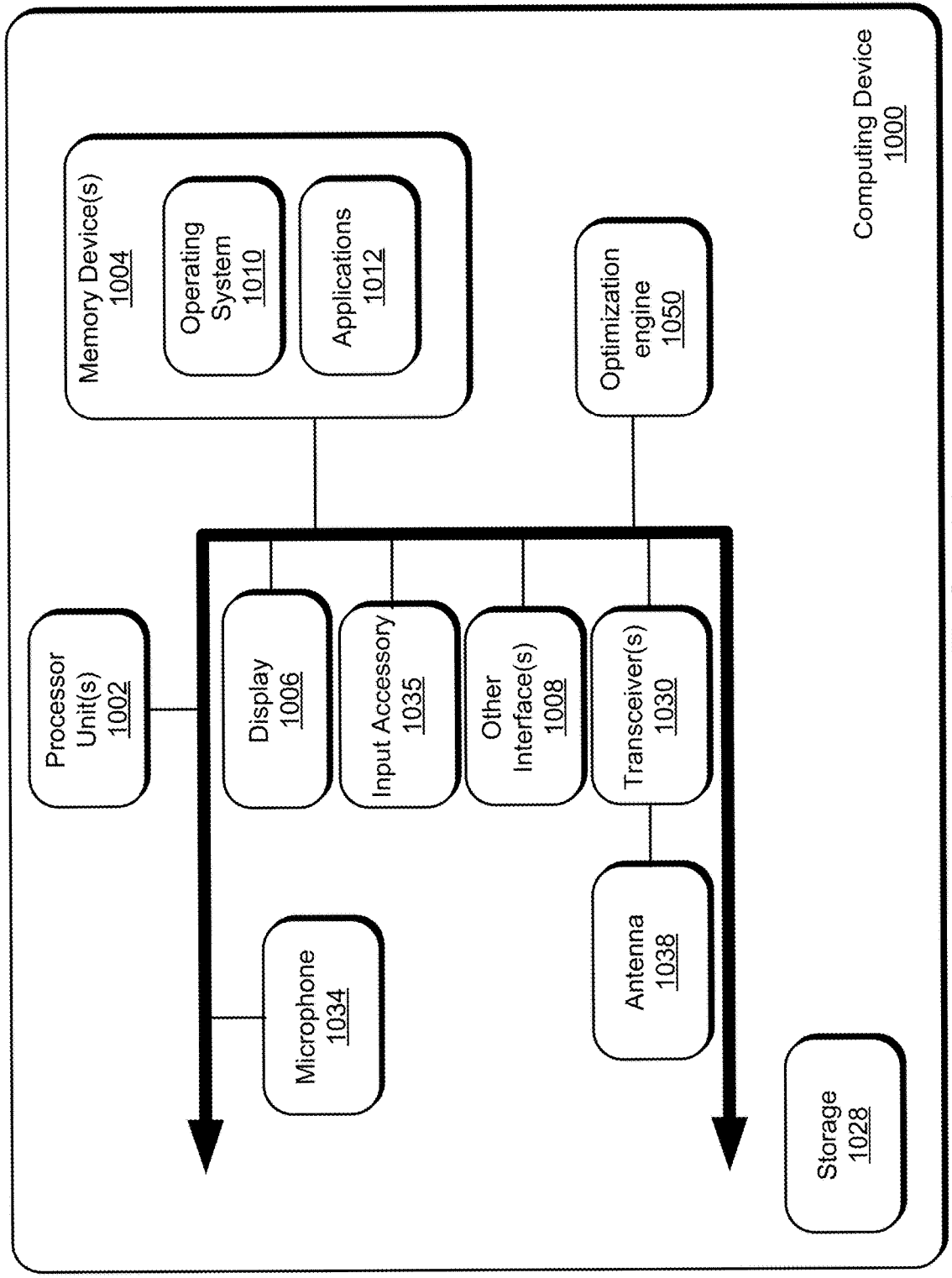
FIG. 10 depicts an example of a computing device for realization of aspects of the present disclosure.

FIG. 10 illustrates an example schematic of a computing device 1000 suitable for implementing aspects of the disclosed technology including an optimization engine 1050 as described above. The computing device 1000 includes one or more processor unit(s) 1002, memory 1004, a display 1006, and other interfaces 1008 (e.g., buttons). The memory 1004 generally includes both volatile memory (e.g., RAM) and non-volatile memory (e.g., flash memory). An operating system 1010, such as the Microsoft Windows® operating system, the Apple macOS operating system, or the Linux operating system, resides in the memory 1004 and is executed by the processor unit(s) 1002, although it should be understood that other operating systems may be employed.

One or more applications 1012 are loaded in the memory 1004 and executed on the operating system 1010 by the processor unit(s) 1002. Applications 1012 may receive input from various input local devices such as a microphone 1034, input accessory 1035 (e.g., keypad, mouse, stylus, touchpad, joystick, instrument mounted input, or the like). Additionally, the applications 1012 may receive input from one or more remote devices such as remotely-located smart devices by communicating with such devices over a wired or wireless network using more communication transceivers 1030 and an antenna 1038 to provide network connectivity (e.g., a mobile phone network, Wi-Fi®, Bluetooth®). The computing device 1000 may also include various other components, such as a positioning system (e.g., a global positioning satellite transceiver), one or more accelerometers, one or more cameras, an audio interface (e.g., the microphone 1034, an audio amplifier and speaker and/or audio jack), and storage devices 1028. Other configurations may also be employed.

The computing device 1000 further includes a power supply 1016, which is powered by one or more batteries or other power sources and which provides power to other components of the computing device 1000. The power supply 1016 may also be connected to an external power source (not shown) that overrides or recharges the built-in batteries or other power sources.

In an example implementation, the computing device 1000 comprises hardware and/or software embodied by instructions stored in the memory 1004 and/or the storage devices 1028 and processed by the processor unit(s) 1002. The memory 1004 may be the memory of a host device or of an accessory that couples to the host. Additionally or alternatively, the computing device 1000 may comprise one or more field programmable gate arrays (FPGAs), application specific integrated circuits (ASIC), or other hardware/software/firmware capable of providing the functionality described herein.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for optimization of a data channel. The method includes selecting, with a first intelligent agent, an initial data channel condition comprising initial data channel parameters of the data channel. The method also includes communicating the initial data channel parameters from the first intelligent agent to a second intelligent agent and a black box optimizer. The second intelligent agent is operative to select hyperparameters for use by the black box optimizer in an optimization algorithm for optimization of one or more data channel parameters. The method includes performing the optimization algorithm by the black box optimizer to generate reward information regarding optimization of the data channel in view of the initial data channel parameters and communicating the reward information to the first intelligent agent. The method also includes revising the initial data channel condition to a revised initial data channel condition comprising revised initial data channel parameters using the first intelligent agent. In turn, the method includes communicating the revised initial data channel parameters to the second intelligent agent and the black box optimizer.

Implementations may include one or more of the following features. For example, the method may include iteratively repeating the selecting, communicating the initial data channel parameters, performing the optimization, communicating the reward information, and revising the initial data channel condition operations until an optimization threshold regarding the reward information is satisfied.

In an example, the method includes receiving one or more environmental parameters comprising at least one of data rate information or zone information from the data channel. The method of optimization may be relative to the one or more environmental parameters to determine data channel parameters specific to the one or more environmental parameters.

In an example, the method may include imposing a penalty function on the optimization algorithm performed by the black box optimizer. The penalty function may impose at least one of a time penalty on a time duration required to optimize the data channel parameters or a number of writing and read cycles required to optimize the data channel parameters. Additionally or alternatively, the penalty function may be selectively applicable to one or more penalized data channel parameters.

In an example, the method may include determining a sensitivity of a plurality of candidate data channel parameters on the reward information. The method may also include applying a trim value to a ranked listing of the plurality of candidate data channel parameters to identify a subset of the plurality of candidate data channel parameters. The data channel parameters may be optimized in view of the subset of the plurality of candidate data channel parameters.

In an example, the revised initial data channel condition may be determined by application of a policy that is a function of a state and a parameter vector. The parameter vector may be associated with an iteratively trained neural network to select values of the parameter vector that maximize the reward information.

Another general aspect of the present disclosure includes a method for optimization of a data channel. The method includes iteratively selecting initial data channel parameters for the data channel using a first intelligent agent. The method also includes performing an optimization algorithm using a black box optimizer having hyperparameters regarding the optimization algorithm selected by a second intelligent agent in operative communication with the black box optimizer. The optimization algorithm iteratively modifies data channel parameters from each of the iteratively selected initial data channel parameters received from the first intelligent agent. The method includes generating reward information for each iteration of the performing of the optimization algorithm. In addition, the method includes determining a sensitivity of each of the data channel parameters on the reward information and selecting a subset of the data channel parameters based on the sensitivity of each of the data channel parameters on the reward information. In turn, the method includes performing the optimization algorithm using the black box optimizer in which only the subset of the data channel parameters are iteratively modified in the optimization algorithm.

Implementations may include one or more of the following features. For example, the selecting may include ranking the data channel parameters according to the sensitivity of each of the data channel parameters on the reward information and applying a trim value to the ranked data channel parameters to select the subset of the data channel parameters. The sensitivity of a given data channel parameter may correspond to a derivative of the reward information with respect to the given data channel parameter. The method may include holding all of the data channel parameters not belonging to the subset of the data channel parameters fixed during the second performing.

In an example, the method may include imposing a penalty function on the optimization algorithm performed by the black box optimizer. The penalty function may impose at least one of a time penalty on a time duration required to optimize the data channel parameters or a number of writing and read cycles required to optimize the data channel parameters. Additionally or alternatively, the penalty function may be selectively applicable to one or more penalized data channel parameters.

Another general aspect of the present disclosure includes an optimization system for optimizing a plurality of data channel parameters of a data channel. The system includes an optimization engine. The optimization engine includes a first intelligent agent, a second intelligent agent, and a black box optimizer. The first intelligent agent is for selection of an initial data channel condition comprising initial data channel parameters of the data channel. The second intelligent agent receives the initial data channel parameters from the first intelligent agent. The second intelligent agent is operative to select hyperparameters for an optimization algorithm for optimization of one or more data channel parameters. The black box optimizer receives the initial data channel parameters from the first intelligent agent and the hyperparameters from the second intelligent agent. The black box optimizer performs the optimization algorithm and generates reward information from a bit rate error. The first intelligent agent is operative to revise the initial data channel condition to a revised initial data channel condition comprising revised initial data channel parameters using the first intelligent agent and communicating the revised initial data channel parameters to the second intelligent agent and the black box optimizer for iterative performance of the optimization algorithm. The system also includes a test bench in operative communication with data channel hardware to operate the data channel hardware using data channel parameters received from the black box optimizer and communicate the bit error rate to the optimization engine.

Implementations may include one or more of the following features. For example, the optimization engine may be operative to receive one or more environmental parameters comprising at least one of data rate information or zone information from the data channel. The optimization algorithm may be performed relative to the one or more environmental parameters to determine data channel parameters specific to the one or more environmental parameters.

In an example, the optimization engine may also include a penalty function module for imposing a penalty function on the optimization algorithm performed by the black box optimizer. The penalty function may impose at least one of a time penalty on a time duration required to optimize the data channel parameters or a number of writing and read cycles required to optimize the data channel parameters.

In an example, the black box optimizer may be operative to determine a sensitivity of a plurality of candidate data channel parameters on the reward information. In turn, the system may apply a trim value to a ranked listing of the plurality of candidate data channel parameters to identify a subset of the plurality of candidate data channel parameters. The data channel parameters may be optimized in view of the subset of the plurality of candidate data channel parameters.

In an example, the revised initial data channel condition may be determined by application of a policy that is a function of a state and a parameter vector. The parameter vector is associated with an iteratively trained neural network to select values of the parameter vector that maximize the reward information.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for optimization of a data channel, comprising:
   selecting, with a first intelligent agent, an initial data channel condition comprising initial data channel parameters of the data channel;
   communicating the initial data channel parameters from the first intelligent agent to a second intelligent agent and a black box optimizer, wherein the second intelligent agent is operative to select hyperparameters for use by the black box optimizer in an optimization algorithm for optimization of one or more data channel parameters;
   performing the optimization algorithm by the black box optimizer to generate reward information regarding optimization of the data channel in view of the initial data channel parameters;
   communicating the reward information to the first intelligent agent;
   revising the initial data channel condition to a revised initial data channel condition comprising revised initial data channel parameters using the first intelligent agent; and
   communicating the revised initial data channel parameters to the second intelligent agent and the black box optimizer.

2. The method of claim 1, further comprising:
   iteratively repeating the selecting, communicating the initial data channel parameters, performing the optimization, communicating the reward information, and revising the initial data channel condition operations until an optimization threshold regarding the reward information is satisfied.

3. The method of claim 1, further comprising:
   receiving one or more environmental parameters comprising at least one of data rate information or zone information from the data channel; and
   wherein the method of optimization is relative to the one or more environmental parameters to determine data channel parameters specific to the one or more environmental parameters.

4. The method of claim 1, further comprising:
   imposing a penalty function on the optimization algorithm performed by the black box optimizer.

5. The method of claim 4, wherein the penalty function imposes at least one of a time penalty on a time duration required to optimize the data channel parameters or a number of writing and read cycles required to optimize the data channel parameters.

6. The method of claim 4, wherein the penalty function is selectively applicable to one or more penalized data channel parameters.

7. The method of claim 1, further comprising:
   determining a sensitivity of a plurality of candidate data channel parameters on the reward information;
   applying a trim value to a ranked listing of the plurality of candidate data channel parameters to identify a subset of the plurality of candidate data channel parameters; and
   wherein the data channel parameters are optimized in view of the subset of the plurality of candidate data channel parameters.

8. The method of claim 1, wherein the revised initial data channel condition are determined by application of a policy that is a function of a state and a parameter vector, wherein the parameter vector is associated with an iteratively trained neural network to select values of the parameter vector that maximize the reward information.

9. A method for optimization of a data channel, comprising:
   iteratively selecting initial data channel parameters for the data channel using a first intelligent agent;
   performing an optimization algorithm using a black box optimizer having hyperparameters regarding the optimization algorithm selected by a second intelligent agent in operative communication with the black box optimizer, wherein the optimization algorithm iteratively modifies data channel parameters from each of the iteratively selected initial data channel parameters received from the first intelligent agent;
   generating reward information for each iteration of the performing of the optimization algorithm;
   determining a sensitivity of each of the data channel parameters on the reward information;
   selecting a subset of the data channel parameters based on the sensitivity of each of the data channel parameters on the reward information; and
   performing the optimization algorithm using the black box optimizer in which only the subset of the data channel parameters are iteratively modified in the optimization algorithm.

10. The method of claim 9, wherein the selecting comprises:
    ranking the data channel parameters according to the sensitivity of each of the data channel parameters on the reward information; and
    applying a trim value to the ranked data channel parameters to select the subset of the data channel parameters.

11. The method of claim 9, wherein the sensitivity of a given data channel parameter corresponds to a derivative of the reward information with respect to the given data channel parameter.

12. The method of claim 11, further comprising:
    holding all of the data channel parameters not belonging to the subset of the data channel parameters fixed during the second performing.

13. The method of claim 9, further comprising:
    imposing a penalty function on the optimization algorithm performed by the black box optimizer.

14. The method of claim 13, wherein the penalty function imposes at least one of a time penalty on a time duration required to optimize the data channel parameters or a number of writing and read cycles required to optimize the data channel parameters.

15. The method of claim 13, wherein the penalty function is selectively applicable to one or more penalized data channel parameters.

16. An optimization system for optimizing a plurality of data channel parameters of a data channel, comprising:
    an optimization engine comprising:
       a first intelligent agent for selection of an initial data channel condition comprising initial data channel parameters of the data channel,
       a second intelligent agent that receives the initial data channel parameters from the first intelligent agent, wherein the second intelligent agent is operative to select hyperparameters for an optimization algorithm for optimization of one or more data channel parameters, and
       a black box optimizer that receives the initial data channel parameters from the first intelligent agent and the hyperparameters from the second intelligent agent, wherein the black box optimizer performs the optimization algorithm and generates reward information from a bit rate error,
       wherein the first intelligent agent is operative to revise the initial data channel condition to a revised initial data channel condition comprising revised initial data channel parameters using the first intelligent agent and communicating the revised initial data channel parameters to the second intelligent agent and the black box optimizer for iterative performance of the optimization algorithm; and
    a test bench in operative communication with data channel hardware to operate the data channel hardware using data channel parameters received from the black box optimizer and communicate the bit error rate to the optimization engine.

17. The system of claim 16, wherein the optimization engine is operative to receiving one or more environmental parameters comprising at least one of data rate information or zone information from the data channel, and wherein the optimization algorithm is performed relative to the one or more environmental parameters to determine data channel parameters specific to the one or more environmental parameters.

18. The system of claim 16, wherein the optimization engine further comprises a penalty function module for imposing a penalty function on the optimization algorithm performed by the black box optimizer, wherein the penalty function imposes at least one of a time penalty on a time duration required to optimize the data channel parameters or a number of writing and read cycles required to optimize the data channel parameters.

19. The system of claim 16, wherein the black box optimizer is further operative to:
    determine a sensitivity of a plurality of candidate data channel parameters on the reward information;
    apply a trim value to a ranked listing of the plurality of candidate data channel parameters to identify a subset of the plurality of candidate data channel parameters; and
    wherein the data channel parameters are optimized in view of the subset of the plurality of candidate data channel parameters.

20. The system of claim 16, wherein the revised initial data channel condition are determined by application of a policy that is a function of a state and a parameter vector, wherein the parameter vector is associated with an iteratively trained neural network to select values of the parameter vector that maximize the reward information.

* * * * *